April 7, 1925.
V. KARBOWSKI
PIPE CUTTER
Filed Dec. 17, 1923
1,532,315
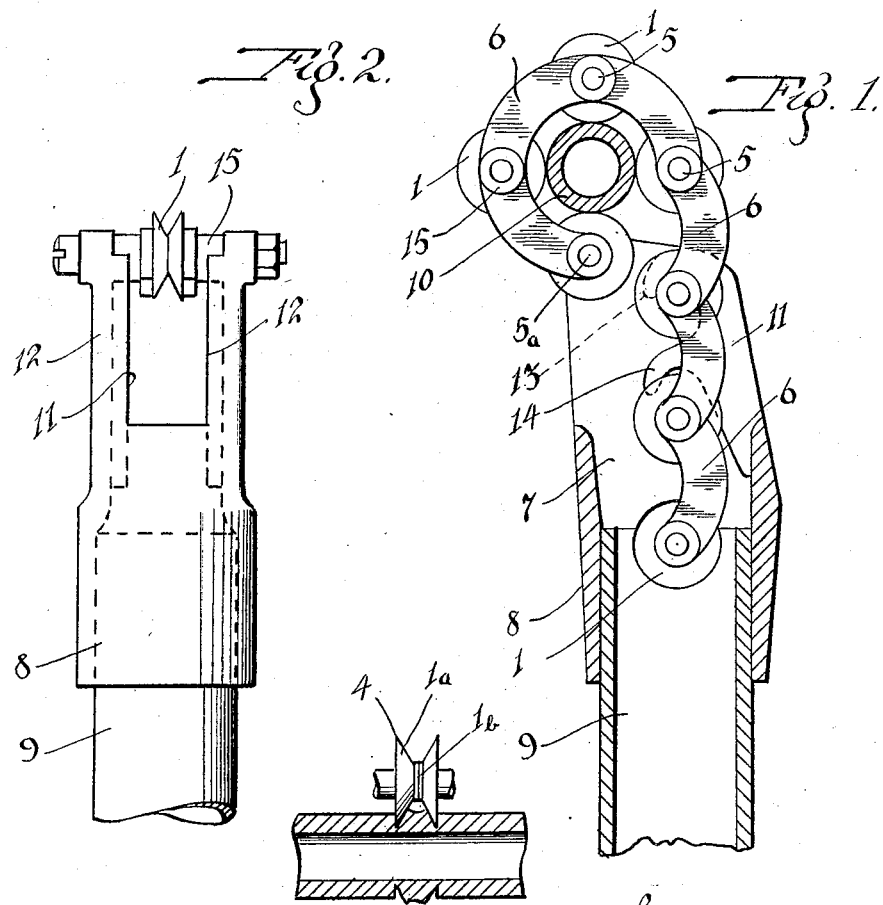
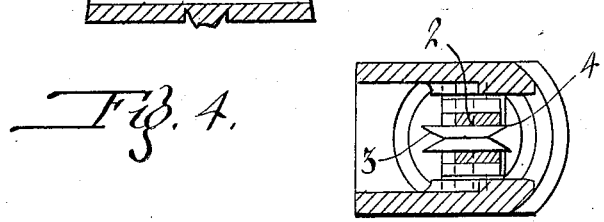
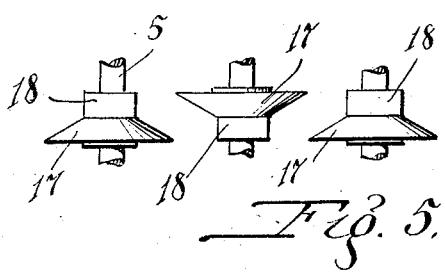
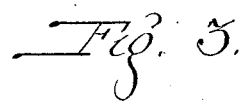
INVENTOR
V. Karbowski
BY
ATTORNEYS Patented Apr. 7, 1925.

1,532,315

UNITED STATES PATENT OFFICE.

VICTOR KARBOWSKI, OF CHICAGO, ILLINOIS.

PIPE CUTTER.

Application filed December 17, 1923. Serial No. 681,255.

*To all whom it may concern:*

Be it known that I, VICTOR KARBOWSKI, a citizen of Poland, and a resident of Chicago, in the county of Cook and State of Illinois, have invented a new and useful Improvement in Pipe Cutters, of which the following is a full, clear, and exact description.

My invention relates to improvements in pipe cutters, particularly to that type of pipe cutter adapted to cut pipe of various diameters, and it consists in the combinations, constructions and arrangements herein described and claimed.

An object of my invention is to provide a device of the type described in which a multiplicity of cutting wheels are employed at predetermined equally spaced distances from one another so that the pipe having a relatively large circumference may have a greater number of cutting wheels in contact therewith than a pipe of relatively small circumference.

A further object of my invention is to provide a device of the type described by means of which the cutting wheels may be drawn into exceedingly close engagement with the work and in which the pressure with which the wheels bear upon the work may be manually varied at will.

A further object of my invention is to provide a device of the type described in which the pipe cutting wheels are of particularly novel construction and in which the wheels are arranged in a novel manner while in work engaging position relative to the pipe.

Other objects and advantages will appear in the following specification, and the novel features of the invention will be particularly pointed out in the appended claims.

My invention is illustrated in the accompanying drawings, forming part of this application, in which Figure 1 is a sectional view of an embodiment of my invention, Figure 2 is an end elevation of the mechanism illustrated in Figure 1, Figure 3 is a sectional view along the line 3—3 of Figure 1, Figure 4 is a view of a modified form of the pipe cutting wheel, and Figure 5 is still another modified form of the pipe cutting wheel.

In carrying out my invention I make use of a plurality of pipe cutting wheels 1. These wheels are provided with substantially flat parallel side walls 2 and have a V-shaped groove 3 on the outer peripheral wall thereof, which groove merges with the flat side walls 2 to form a sharp cutting edge 4. The wheels 1 are rotatably mounted upon shafts 5, which shafts serve also as locking pins for adjacent links of a chain. These links are indicated at 6 and each consists of two segments, one on either side of the wheels 1.

It is apparent, therefore, that the distance between the centers of the wheels 1 is accurately determined and remains constant throughout the operation of the device. The links 6 are arcuate in contour, (see Figure 1) so as to more easily conform to relatively small pipe such as the pipe shown in Figure 1.

The uppermost end of the chain formed of the links 6 has its lock pin or shaft $5^a$ secured directly to the uppermost end of the body member 7. The body member 7 is substantially tubular at its lowermost end 8 and is provided with threads on the exterior wall thereof arranged to receive the threaded upper end of an iron pipe which pipe serves as a handle by means of which the pipe cutter may be manipulated.

Means for locking the outermost portion of the chain formed of the links 6 to the body member 7 subsequent to the encompassing of the chain about a pipe such as the pipe 10 is provided in a pair of inwardly extending bosses 11 disposed upon a bifurcated portion 12 of the body member 7. These bosses 11 are fashioned to form a pair of diametrically opposed hook members 13 and 14 respectively on the inner wall of the bifurcated portion 12.

It will be noted from inspection of Figure 2 that each of the links 6 has an outwardly extending collar portion concentric with the shaft of the locking pin 5. These collars extend outwardly from the side walls of the links 6 and just clear the inner side walls of the bifurcated portion 12 of the body member 7. These collar portions, however, do not clear the hook members 13 and 14 of the bosses 11 so that any of the links 6 may be locked against movement longitudinally by engagement of its adjacent collar portion 15 with either of the cooperating hook portions 13 or 14 of the bosses 11.

From the foregoing description of the various parts of the device, the operation thereof may be readily understood. In employing my improved pipe cutter for the cutting of pipe having relatively small diameter, I first encompass the pipe at that point at which the pipe is to be cut with the links 6 carrying the cutting wheels 1. The links 6 should be drawn within the hollow handle portion 9 of the cutter until the wheels 1 adjacent to the pipe 10 are in close engagement therewith.

It is then necessary to engage the adjacent collar 15 with the opposed hook portions 13 of the bosses 11. It should be noted at this time that I employ the hook portions 13 for a relatively small pipe, but for a large pipe, the hook portions 14 may be best employed for securing the free ends of the chain against movement. This is due to the fact that greater leverage may be obtained by securing the free end of the links 6 to the hook portion 13, whereas less leverage but greater movement of chain may be obtained by the engagement of the free ends of the chain with the links 14. This is particularly desirable in cutting large pipe.

It will also be noted that because of the peculiar construction of the cutting wheels 6 that the end wall of that part of the pipe from which its segmental portion has been severed will be provided with a substantially flat surface perpendicular to the axis of the pipe.

In Figure 4 I have shown a modified form of my invention in which the wheel 1 is comprised of a pair of cooperating elements 1ª, which are spaced apart from one another by means of laterally extending bosses 1ᵇ. This cutting wheel 1ª operates in the same manner as the cutting wheel 1, save for the fact that more space is obtained between the cutting edges 4 of the wheel and therefore may be advantageously employed for pipe of relatively great thickness.

In Figure 5 I have shown still another modified form of my invention in which the cutting wheels 1 are replaced by cutting wheels 17. These cutting wheels 17 have substantially the contour of one-half of the wheel 1, but are further provided with a cylindrical boss 18 on one side thereof. The wheels are placed in the chain form of the links 6 by reversing every second wheel.

The operation of this form of my invention is precisely the same as the preferred form.

I claim:

1. In a pipe cutting device of the type described, a cutting wheel having substantially flat side walls perpendicular to the shaft upon which said cutting wheel is mounted and having a V-shaped recess in the outer peripheral wall thereof, its side walls merging with the side walls of said cutting wheels to form a pair of sharp cutting edges.

2. A pipe cutter of the type described comprising a handle member, a chain consisting of a plurality of links secured to one another by means of shafts, and having one end secured to the handle member, a pipe cutting wheel rotatably mounted on each of said shafts, said wheels having substantially flat side walls perpendicular to the shaft upon which they are mounted and having a V-shaped recess in the outer peripheral wall thereof, its walls merging with the side walls of said cutting wheels to form a pair of sharp cutting edges, and means for securing the free end of said chain to said handle, whereby said chain may be wrapped about the outer wall of said pipe and be moved longitudinally therearound to cause the cutting wheels to bite into and sever said pipe.

VICTOR KARBOWSKI.